Feb. 16, 1960

P. V. PALAZZO 2,924,960

PADLOCK FOR VALVES

Filed Aug. 23, 1957

INVENTOR.
PIETRO V. PALAZZO.
BY
Nachtman + Zoda
ATTORNEYS

United States Patent Office 2,924,960
Patented Feb. 16, 1960

2,924,960

PADLOCK FOR VALVES

Pietro V. Palazzo, Philadelphia, Pa.

Application August 23, 1957, Serial No. 679,854

6 Claims. (Cl. 70—180)

This invention relates generally to locking devices, and more particularly has reference to a lock engageable with a valve stem in such a manner as to prevent operation of the valve by unauthorized individuals. The invention has particular reference to a locking device of the padlock type, applicable to valves of the type controlling flow of water into a house, apartment, or other structure from a main or similar source of water under pressure. Most usually, a valve of this type is a gate valve, and comprises a fitting connected in the water line, said fitting having a sleeve-like form, and including a projecting part from which extends forwardly a valve stem which is rotated for the purpose of opening or closing the valve. Said stem has a hand wheel or equivalent handle means, and said hand wheel is ordinarily detachably connected with the stem for rotation therewith. In a typical embodiment, for example, the stem may have a reduced, axial extension of square or other non-circular cross section, with the hand wheel having a complementary opening receiving said extension. In another common form, the stem is splined at its outer end, with the hand wheel having a mating splined formation at its center.

In this connection, the invention has as its main purpose the locking of the valves of water pipes, to prevent unauthorized opening of the valves. In large apartment buildings, for example, there may be individual hot water pipes to each apartment, all of which pipes may be exposed within the basement of the building. It often happens that a tenant who is leaving on a trip of some duration will lock the valve of the pipe leading to his apartment, by attempting to extend chains, etc., through the spaces between the spokes of the hand wheel that is generally provided upon the stem of the valve. This is not satisfactory, however, because the hand wheel is merely held in place by a screw, and can be easily removed, after which an unauthorized individual may open the valve by means of a wrench applied to the usual noncircular end portion of the valve stem.

The padlock for valves constituting the present invention somewhat resembles a bicycle lock, in that it has a body in which a key is insertable, said body being preferably, but not necessarily, formed of a plurality of superposed plates. Engageable in the body are the notched arms of a generally U-shaped hasp. The lock of the invention, however, has a longitudinal recess opening onto the space between the arms of the hasp, at the end of the body opposite that in which the key is inserted. Further, the bight portion of the hasp is bifurcated and is provided with a hinge, to permit the legs to be spread apart from one another to facilitate insertion of the hasp through relatively small spaces, as for example, the space between a wall and a water pipe that extends in closely spaced relation to the wall.

In accordance with the present invention, the hand wheel is first removed, leaving exposed the noncircular end portion of the valve stem. Then the hasp is extended about the water pipe, with the hinge means of the hasp facilitating its being positioned about the pipe. Then, one shifts the body of the lock longitudinally of the legs of the hasp, and this causes the distal end of the valve stem to enter the recess formed in the body of the lock. It thus becomes completely impossible to rotate the valve stem, since the entire lock, valve stem, and pipe in effect are now rigidly interconnected.

Another object of the invention is to provide a valve locking device as stated which will be of comparatively low cost, considering the benefits to be obtained from the use thereof.

Still another object is to provide a padlock for valves that will be so designed as to be applicable to and removable from a valve with maximum ease and facility, so far as an authorized individual is concerned.

Yet another object of importance is to provide a padlock for valves which, when applied to a valve body and to a stem projecting forwardly from said body, will be particularly designed to relieve the valve stem of undue stress and strains that might otherwise tend to cause the same to be snapped off, in the event an unauthorized individual attempts to tamper with the valve and locking device.

A further object of importance is to provide a padlock for valves that will be applicable to a conventional valve of the type previously described herein, without requiring any modification or redesign of said valve, or of a conduit in which the valve is connected.

Other objects will appear from the following description, the claims appended thereto, and from the annexed drawings, in which like reference characters designate like parts throughout the several views, and wherein:

Figure 2:
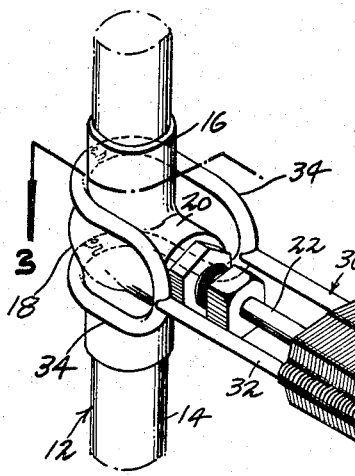
Figure 2 is a perspective view showing the device in its fully applied position.
Figure 1:
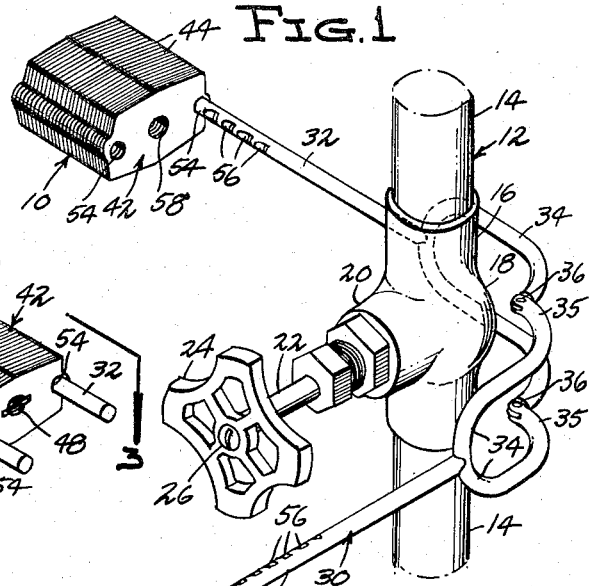
Figure 1 is a perspective view showing a fragmentary portion of a water line in which a conventional valve is mounted, with the device being shown as it appears when being applied to the line.
Figure 3:
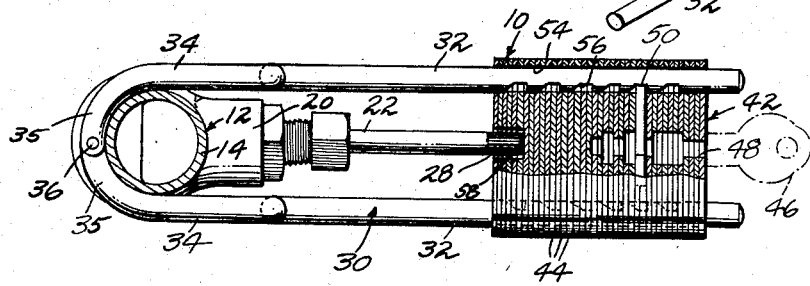
Figure 3 is an enlarged sectional view on line 3—3 of Figure 2, with a key being shown in dotted lines in inserted position.
Figure 4:
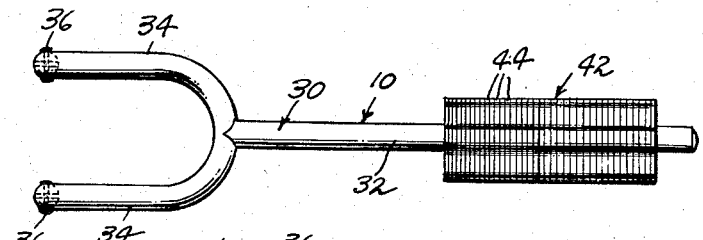
Figure 4 is a side elevational view of the locking device per se.

Referring to the drawing in detail, designated generally at 10 is a locking device for valves formed according to the present invention. Said locking device is illustrated in Figures 1-3 in operative relationship to a conventional pipe assembly generally designated 12, said pipe assembly including the pipe sections 14 connected to the opposite ends of a hollow valve body 16 having medially between its ends the usual bulbous or enlarged portion 18. The valve includes the forwardly projecting portion 20, out of which extends an elongated, straight valve stem 22 adapted to be rotated for opening or closing the valve by means of a hand wheel 24. The hand wheel is connected to the stem 22 removably, and when connected to the stem is rotatable therewith. For example, a screw 26 may extend to an axial recess provided in a splined end portion 28 of stem 22, said end portion being engageable in a complementarily splined center opening of the hand wheel.

All this is conventional construction and does not, per se, constitute part of the present invention. In this connection, it will be understood that the valve illustrated and described might vary from one installation to another. In every instance, however, so far as is known, the valve would include a stem projecting laterally outwardly from the pipe through which the water or other fluid flows.

Figure 5:
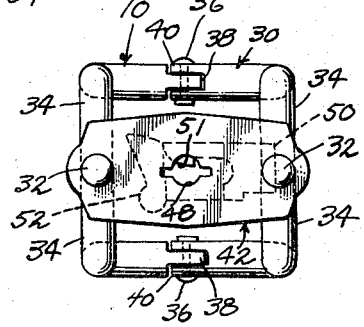
Figure 5 is an end elevational view of the device as seen from the right of Figure 4, the scale being enlarged above that of Figure 4.

Referring now to the construction of the lock constituting the invention, said lock includes a hasp assembly generally designated at 30. Said assembly includes identically but oppositely formed, elongated, straight legs 32 each of which is integral or otherwise made rigid at one end with a bifurcation that comprises fork arms 34 integral with a curved bight that constitute the part of the bifurcation rigid with the associated leg 32. The fork arms 34, at the ends thereof remote from the bight, curve laterally inwardly as at 35 toward the bifurcation of the other leg. Referring to Figure 5, the laterally inwardly curved ends 35 of the fork arms 34 are hingedly connected by pin 36 positioned in registering openings of tongues 38 and grooved end portions 40 of the respective bifurcations. Thus, the bifurcated leg structures are connected for relative swinging movement about an axis normal to the length of the legs 32 and perpendicular to the common plane of said legs 32.

Generally designated at 42 is the body of the lock. In the illustrated example, but not necessarily, the body comprises a plurality of plates 44 which are fixedly connected with their edges in flush relation. A key 46 is extendable into a key-receiving-passage 48 formed in the rear or outer end of the body 42. The passage 48 is provided by cutting adjacent plates or laminations to form openings of different sizes therein, thus providing a passage having, at selected locations longitudinally thereof, enlargements mating with the shank of the key 46.

Extending partially across the passage is a locking plate 50, having a tooth 51 adapted for engagement by the key when the key is rotated, whereby said plate 50 is shifted out of engagement with a selected notch of a leg 32 of the hasp assembly. A dog 52 normally biases, by spring action, the plate 50 to its locking position shown in Figures 3 and 5. Formed in the body 42, adjacent opposite sides thereof, are longitudinal, open-ended bores 54 receiving the respective legs 32, and the portions of the legs that extend into the bores are formed with uniformly spaced locking notches 56.

This particular locking action and mechanism is known in and of itself and is illustrated merely to show the adaptability of the invention for utilizing basically conventional padlock actions and structures. As will be readily understood, any selected notch 56 is adapted for engagement by the plate 50, that is, the body 42 can be shifted longitudinally of the legs 32 to any of various locations spaced longitudinally of the legs.

Designated at 58 is a socket or recess which is comparatively deep, and which is of a diameter only slightly greater than that of the stem 22. The recess 58 opens upon the inner end of the body, that is, upon the space bounded by the body and the hasp assembly. As previously noted, stem 22 extends within this space, and accordingly, when the body 42 is shifted toward the bight portion of the hasp assembly, the splined end 28 (the hand wheel 24 having been previously removed) will enter the recess 58. With the end 28 engaged fully in the recess 58, a notch 56 registers with plate 50, so that the body is lockably engaged with said legs 32.

In use of the device, as previously noted the hand wheel 24 is removed. The device is extended about the valve in the manner shown in Figure 1. By reason of the hinge connections 36, the legs 32 can be relatively swingably adjusted outwardly from one another, to facilitate extension of the device about the valve.

After the hasp assembly has been extended about the body of the valve, the legs 32 are swung toward each other into parallel relation, and will be spaced laterally outwardly from stem 22, in parallel relation to the stem. Then, body 42 of the lock is shifted toward the stem along the legs, to receive the splined end 28 and lock the device in the position shown in Figures 2 and 3.

By reason of this arrangement, an unauthorized individual is prevented from rotating the stem 22, so that the valve is swiftly but effectively locked in either an open or a closed position, whichever is desired by the user.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

Having thus described my invention, I claim as new, and desire to protect by Letters Patent:

1. A lock for a valve of the type including a valve body and a stem projecting outwardly from said body, comprising: a hasp assembly including a pair of legs connected at one end to each other and extending in laterally spaced relation, thus to be extendable in embracing relation to said valve body, the legs being bifurcated at said one end thereof for engaging the valve body in locations spaced longitudinally of said body; and a lock body movable relative to said legs into and out of a locking position in which both legs are fixedly connected at their other ends to the lock body, said lock body releasably, lockingly engaging the legs in said position of the lock body, the lock body having a longitudinal recess medially between opposite sides of the lock body, said recess having its length parallel to and spaced laterally inwardly from said other ends of the legs in coplanar relation therewith, the recess being formed in one end of the lock body and opening toward the connected ends of the legs for receiving said stem.

2. A lock for a valve of the type including a valve body and a stem projecting outwardly from said body, comprising: a hasp assembly including a pair of legs extending in laterally spaced relation, thus to embrace said valve body, the legs having bifurcations at one end thereof for engaging the valve body at locations spaced longitudinally of the valve body, said bifurcations at one end projecting laterally inwardly toward each other and being hingedly joined, for swinging of the legs toward and away from each other; and a lock body movable relative to said legs into and out of a locking position in which both legs are extended into and are fixedly engaged within one end of the lock body, said lock body releasably, lockingly engaging the legs in said position of the lock body, the lock having a longitudinal recess medially between opposite sides of the lock body, said recess being formed in said one end of the lock body at a location coplanar with and equidistant from the locations at which said other ends of the legs are engaged in the lock body, for receiving said stem.

3. A lock as in claim 2 wherein, in the locking position of the lock body, the fork arms of the bifurcations are extended at opposite sides of and symmetrically in respect to the plane in which said other ends of the legs, and said recess, lie.

4. A lock for a valve of the type including a valve body and a stem projecting outwardly from said body, comprising: a hasp assembly including a pair of legs, said legs being formed at one end with bifurcations, each bifurcation comprising a bight part and fork arms extending from said bight part, said fork arms, at the ends thereof remote from the bight part, each curving through substantially 90 degrees toward the bifurcation of the other leg, corresponding arms of the respective bifurcations being hingedly connected, for swinging of the legs toward and away from each other into and out of, respectively, a position embracing the valve body, said legs, at the other ends thereof, having straight portions extending in parallel relation to said valve-body-embracing positions of the legs, said other ends of the legs lying in a common plane normal to the axis of relative swinging movement of the legs with the fork arms of each bifurcation being disposed at opposite sides of and symmetrically in respect to said plane; and a lock body movably connected with said other ends of the legs and extending between said other ends of the legs when the legs are in said valve-body-embracing positions thereof, in locking engagement with the legs, said lock body having a recess between and extending parallel to the legs and opening in the direction of the bifurcations to receive said stem, said recess lying in said common plane of the other ends of the legs.

5. A lock for a valve of the type that includes a hollow, elongate valve body connectible in a pipe line and having a bulbous portion, and a stem projecting radially outwardly from the bulbous portion perpendicularly to the length of the body, said lock comprising: a lock body having bores opening at least at one end thereof, said lock body having a longitudinal recess opening upon said one end medially between and in spaced, parallel, coplanar relation to the bores of the lock body to receive the stem; and a hasp assembly having legs removably, fixedly engaged at one end in the respective bores, said hasp assembly being U-shaped to embracingly receive the valve body, the hasp assembly at its other end including U-shaped, valve-body-receiving portions disposed in spaced planes, the recess lying wholly in a plane parallel to and located between said planes of the U-shaped portions, the hasp assembly being wholly open between said U-shaped portions for projection of the bulbous portion of the valve body into the space between said planes of the U-shaped portions.

6. A lock for a valve of the type that includes a hollow, elongate valve body connectible in a pipe line and having a bulbous portion, and a stem projecting radially outwardly from the bulbous portion perpendicularly to the length of the body, said lock comprising: a lock body having, at its respective, opposite sides, a pair of parallel, longitudinal bores opening on at least one end of the lock body, said lock body having a longitudinal recess in coplanar, parallel relation to the bores midway therebetween, at said one end of the lock body to receive the stem; and a hasp assembly formed to a U-shape for embracingly receiving said valve body, said hasp assembly including a pair of spaced legs engageable at one end with the valve body and bifurcated at said one end thereof so as to contact the valve body at locations spaced longitudinally of the valve body, said legs being fixedly, removably engaged at their other ends within the respective bores, each bifurcation including a pair of fork arms widely spaced apart for projection of said bulbous portion into the space therebetween, whereby the bulbous portion will engage the legs against displacement in a direction longitudinally of the valve body, the recess lying wholly in a plane parallel to and disposed medially between one plane in which first, corresponding fork arms of the respective legs lie, and another plane in which the other corresponding fork arms of the respective legs lie, coplanar, corresponding fork arms being formed with arcuate parts curved inwardly toward and connected to each other in their common plane, for engagement of the bight of the hasp assembly against the valve body at said locations spaced longitudinally of the valve body with the bulbous portion projecting into the space between the connected, curved parts of said first fork arms and the connected, curved parts of said other fork arms.

References Cited in the file of this patent

UNITED STATES PATENTS

| | | |
|---|---|---|
| 602,982 | Ennis | Apr. 26, 1898 |
| 1,390,674 | Cummings | Sept. 13, 1921 |
| 1,477,777 | Shek | Dec. 18, 1923 |
| 1,614,666 | Fraim | Jan. 18, 1927 |